Patented Oct. 12, 1948

2,451,310

UNITED STATES PATENT OFFICE 2,451,310

ALKYL ESTERS OF α-ACYLAMINO, α-CYANO, β-(3 INDOLE)-PROPIONIC ACID

Noel F. Albertson, East Greenbush, and Sydney Archer and Chester M. Suter, Albany, N. Y., assignors, by mesne assignments, to Winthrop-Stearns Inc., New York, N. Y., a corporation of Delaware No Drawing. Application March 2, 1944, Serial No. 524,776

1 Claim. (Cl. 260—319)

This invention relates to derivatives of indole, and to a novel method of preparing them.

The invention has among its objects the preparation of indole derivatives substituted in the 3-position. Indole derivatives of this type include especially indole-3-propionic acid, which is useful as a plant growth hormone, and β-indolyl-α-aminoproprionic acid or tryptophane, which is one of the amino acids essential for human nutrition.

While indole-3-propionic acid and tryptophane have previously been synthesized, for example, by methods involving the use of indole-3-aldehyde or indole-3-glyoxylic acid, the synthetic methods employed leave much to be desired. One drawback is that the requisite starting materials are rather difficultly accessible, being obtainable from indole only in low yields. Other drawbacks to the prior procedures include the necessity for preparing intermediates which are not readily purified, the inclusion of steps requiring long reaction times, or reaction under pressure.

In contrast, the present invention affords a simple procedure for preparing derivatives of indole-3-propionic acid by a new method not involving the drawbacks of prior procedures.

In essence, the new process comprises condensing, under substantially anhydrous conditions and in the presence of a strong base, a Mannich base of the indole series in which the (N-substituted-amino-)-methyl- group characteristic of Mannich bases is attached to the 3-carbon atom of the indole skeleton

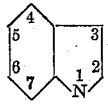

with an active hydrogen compound having the formula

where X is hydrogen or acylamino, Y is carbalkoxyl or cyano, and Z is carbalkoxyl, cyano, or acyl, such as acetyl, propionyl, or benzoyl. The indole-3-propionic acid derivative thus obtained can be further decomposed or hydrolyzed, in accordance with our invention, to form an indole derivative having in the 3-position the substituent

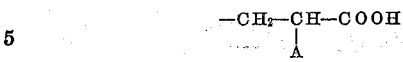

where A is hydrogen or NH₂, depending, respectively, on whether X was hydrogen or acylamino.

The condensation reaction can conveniently be carried out by adding the Mannich base to an alcoholic solution of the active hydrogen compound in the presence of a metal alcoholate, and reaction is facilitated by adding to the mixture an accelerator which is an alkylating agent for tertiary amines.

If the condensation is carried out in alcohol, reaction may be hastened by application of heat, for example, by refluxing the mixture for several hours, after which the reaction product can be isolated in any suitable fashion. Thus, the alcohol may be removed by distillation in vacuo and the residual oil or crystals partitioned between water and a water-immiscible organic solvent such as ether or chloroform. The water layer contains inorganic salts and quaternary ammonium salts. The desired condensation product is in the organic solvent, although, especially if ether is used, some of the condensation product may remain undissolved, if its solubility is limited. In either case, the condensation product can readily be recovered.

While, above, it has been indicated that the condensation may be effected most conveniently in a mutual solvent for the active hydrogen compound and the Mannich base, such as a water-miscible alcohol, other solvents customarily employed for effecting condensations with active hydrogen compounds may be used. Such solvents include ethyl ether, benzene, butyl ether, and the like.

The condensation product is hydrolyzed and decomposed by treatment with dilute alkali, and then with dilute acid.

If alkali is employed, acylamino groups like acetamido, benzamido, or phthalimido will not ordinarily be hydrolyzed unless the conditions of hydrolysis are quite severe. However, more readily hydrolyzed acylamino groups such as carbethoxyamino are relatively easily hydrolyzed.

Alkali hydrolysis will convert the malonic ester derivatives, and the cyanoacetic ester derivatives to metal salts of the corresponding malonic acid derivative, and will convert acylacetic acid derivatives to the corresponding propionic acid derivatives, all in accordance with the following illustrative equations:

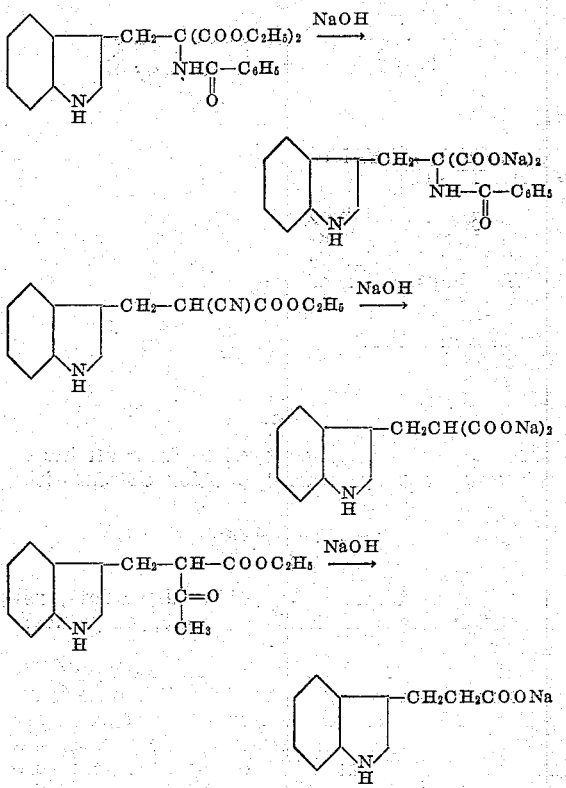

The free acids are of course readily obtained, for example by acidifying aqueous solutions of the metal salts.

Acid hydrolysis will hydrolyze acylamino groups to amino and will also decompose or decarboxylate a malonic acid, with formation of the propionic acid derivative. This is illustrated by the following equation:

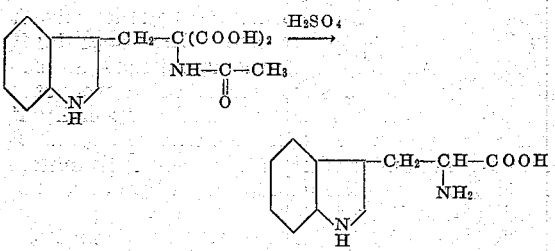

Preferably, alkaline hydrolysis is first employed to selectively hydrolyze the ester groups, after which acid hydrolysis is applied to effect hydrolysis of any acylamino groups, and to effect decarboxylation of a malonic acid grouping.

The requisite Mannich bases can be obtained in excellent yields, for example, according to the directions given in German patent 673,949 for the preparation of gramine. However, any other methods for preparing Mannich bases, such as the methods shown by Blicke (Organic Reactions, volume I, 303–341) can be employed.

It will be appreciated that the invention contemplates the employment of any Mannich base of the indole series, such a base being a

3—(B=N—CH$_2$—)

indole which may be further substituted in the indole skeleton by groupings not affected under the conditions of formation of a Mannich base, and such substituents generally including alkyl, alkoxy, halogen, nitro, acylamino, and dialkylamino. In the above expression for the basic substituent, (B=N—CH$_2$—), attached to the 3-carbon atom, the portion —CH$_2$— is derived from the formaldehyde component, while the B=N— portion is derived from an amine H—N=B of the kind customarily employed in preparing Mannich bases. Here B includes $$\diagup \text{alkyl}$$
$$\diagdown \text{alkyl}$$

and divalent alkylene groups which may bear interrupting oxygen, sulfur, or nitrogen atoms. Among such amines are dimethylamine, diethylamine, methylisobutylamine, morpholine, piperidine, methylbenzylamine, and the like. Other amines which may be employed for the preparation of the Mannich bases are given by Blicke (loc. cit.).

The strong base employed to aid the condensation is conveniently an alcoholate, such as sodium ethylate or potassium t-butylate, of a strongly electropositive metal, such as an alkali or alkaline earth metal, and including sodium, potassium, magnesium, and calcium. Since, however, the base probably reacts in situ with the active hydrogen compound prior to condensation, the particular anion of the strong base is unimportant, provided only that the base is capable of reacting, in a substantially anhydrous medium, with the active hydrogen compound to form the metal derivative of the latter. Hence, instead of employing a metal alcoholate, there may be used other strong bases such as sodamide, sodium triphenyl-methide, sodium hydride, and the like.

While the condensation will proceed even in the presence of considerably less than an equivalent ratio of strong base to active hydrogen compound, the yields under these conditions are less than if a full equivalent, or a slight excess of strong base is present. Hence in practice it is preferable to have sufficient base present to react with all of the active hydrogen compound.

The active hydrogen compound employed in the condensation can be ethyl malonate, ethyl acetoacetate, methyl acetoacetate, butyl acetoacetate, ethyl cyanoacetate, ethyl acetamidomalonate, ethyl benzamidomalonate, ethyl phthalimidomalonate, ethyl carbethoxyaminomalonate, or the like.

As accelerators for the condensation reaction there may be used any alkylating agent for tertiary amines, such accelerators being further characterized by being esters of alcohols with strong acids. The accelerators thus contemplated include methyl iodide, methyl bromide, methyl chloride, methyl sulfate, ethyl iodide, butyl p-toluenesulfonate, benzyl chloride and in general other esters of strong acids such as the hydrohalic acids, sulfuric acid, sulfonic acids, etc. In practice, the choice of accelerator is determined by considerations of economy, ease of handling and ease of removal from the reaction mixture of any unused accelerator and its decomposition products. The esters of the lower water-soluble alcohols best satisfy these requirements.

The accelerator apparently functions by alkylating the amino group during condensation, with formation of a quaternary ammonium grouping permitting more facile elimination of the amine moiety, perhaps in a fashion analogous to the mechanism of the Hofmann degradation. Reaction proceeds even in the absence of the accelerator however, but it is considerably slower, and hence in practice the use of an accelerator is to be preferred.

It will be appreciated that the invention also embraces new and valuable intermediates for the preparation of tryptophane. These intermediates are compounds of the indole series having attached to the 3-carbon atom of the indole skeleton the side chain

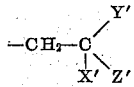

where X' is acylamino, Y' is carboxyl, carbalkoxyl, or cyano, and Z' is carboxyl, carbalkoxyl, cyano, or acyl. For example, acylamino includes acetamido, benzamido, phthalimido, and carbethooxamino. Carbalkoxyl includes —COO—CH$_3$, —COOC$_2$H$_5$, —COO—isoC$_3$H$_7$, —COO—nC$_4$H$_9$, and so on.

The preferred compounds are those obtainable from the relatively readily accessible acylamino-substituted malonic esters, -acetoacetic esters, and -cyanoacetic esters.

The following examples will serve further to illustrate the invention without, however, limiting the scope of the invention thereto.

*Example 1*

One and fifteen-hundredths gram of sodium is dissolved in 100 cc. of anhydrous ethyl alcohol and 10.9 grams of ethyl acetamidomalonate is added to the warm solution. To the resulting clear, colorless solution is added 8.7 g. of gramine (3 - dimethylaminomethylindole). Seven and eight-tenths grams of ethyl iodide in 20 cc. of anhydrous ethyl alcohol is added over a period of forty-five minutes. An aliphatic amine odor is apparent as soon as the ethyl iodide is added. The mixture is refluxed on a steam bath for six hours, during which time a gelatinous precipitate of diethyldimethylammonium iodide is formed. Then the alcohol is removed from the reaction mixture under vacuum, and the residue, a viscous oil, which sometimes crystallizes, is treated with 40 cc. of water and 100 cc. of ethyl ether. After the mixture is warmed and shaken there is present a lower yellow aqueous layer, which contains sodium salts and quaternary ammonium salts, and an upper pale yellow ether layer which contains the major portion of the condensation product suspended as a white crystalline solid. The solid is removed by filtration. The ether solution is successively treated with dilute hydrochloric acid (to remove unreacted gramine), water, sodium bicarbonate solution, and water and is then dried over sodium sulfate, filtered, and evaporated to dryness, whereby a small additional amount of product is obtained. A total of 11.2 g. of crude ethyl (3-indolylmethyl)-acetamidomalonate, which has the structural formula:

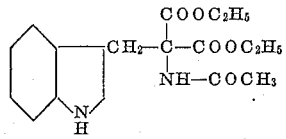

is thus obtained. It may be purified by recrystallization from dilute ethyl alcohol. The pure compound melts at approximately 157°. By using an equivalent molecular proportion of ethyl phthalimidomalonate or ethyl benzamidomalonate, in place of ethyl acetamidomalonate in the above example, one obtains ethyl (3-indolylmethyl) - phthalimidomalonate, or ethyl 3 - (indolylmethyl) - benzamidomalonate, respectively. Likewise, in the above procedure ethyl succinimido-cyanoacetate or ethyl phthalimidoacetoacetate may be employed instead of ethyl acetamidomalonate, and one thereby obtains an ester having the formula

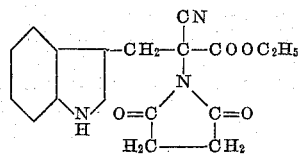

or

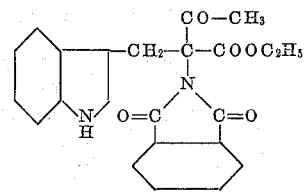

respectively.

One and ninety-six hundredths gram of ethyl 3-indolemethylacetamidomalonate is suspended in 100 cc. of water containing 10 g. of sodium hydroxide. The mixture is boiled for fifteen minutes, during the first half of which time all the solid dissolves. The solution is then cooled to about 10° C. or lower and is maintained at this temperature while concentrated hydrochloric acid is added dropwise with cooling until the solution is acid to Congo red. A small amount of white solid is precipitated. The solution is extracted five times with 20 cc. portions of ethyl ether and the combined ether extracts are dried over sodium sulfate. The ether is removed under vacuum at a temperature below 30° C. There remains as a pale pink solid 1.56 g. of 3-indolemethylacetamidomalonic acid. This substance exists in two polymorphic forms, one ether-soluble and decomposing at about 103° C. the other ether-insoluble and decomposing at about 147° C.

Two and nine-tenths grams of either of the two polymorphic forms of 3-indolemethylacetamidomalonic acid is suspended in 18 cc. of 2 N sulfuric acid and the mixture is heated to boiling. There is a rapid evolution of carbon dioxide and after about fifteen minutes a clear solution is obtained. The solution is refluxed for two hours. To the dark red solution so obtained is added 10 cc. of 10% sodium hydroxide solution and the gummy purple precipitate which forms is filtered off. The pH of the pale yellow filtrate is raised to about 5 by addition of 10% sodium hydroxide solution. After a few minutes fine crystals of tryptophane will separate. The mixture is cooled and the solid is collected on a filter. After drying at 80°, the yield of tryptophane is 1.03 g. From the mother liquor, an additional 0.09 g. can be recovered. The product decomposes at approximately 273° C.

*Example 2*

Twenty-three hundredths gram of sodium is dissolved in 10 cc. of anhydrous ethyl alcohol and to the solution is added 1.3 g. of ethyl acetoacetate. To the resulting clear solution is added 3.30 g. of gramine ethiodide. The mixture is refluxed on a steam bath for four hours, after which the alcohol is removed under vacuum.

The red-brown syrupy residue is extracted with ethyl ether and the ether layer is retained. The ether is removed on a steam bath and the residue, which is ethyl 3-indolemethylacetoacetate, is warmed on a steam bath for two hours with a solution of 15 g. sodium hydroxide in 25 cc. of water. The solution is diluted with several volumes of water and filtered to remove any insoluble matter. The filtrate is acidified by addition of concentrated hydrochloric acid and is then extracted with ethyl ether. The ether extract is dried over sodium sulfate. After removal of the sodium sulfate the ether is evaporated and the residue is dissolved in the minimum amount of ethyl alcohol. On addition of water, the reaction product is precipitated as a white crystalline solid which is collected on a filter. The solid may be further purified by recrystallization from water after treatment with charcoal. The product, which is 3-indolepropionic acid, melts at approximately 132° C.

Instead of using ethyl acetoacetate in the above condensation, ethyl cyanoacetate or ethyl malonate may be used. With gramine, these yield, respectively, ethyl α-cyano-β-(3-indolyl)-propionate and ethyl 3-indolylmethylmalonate, and both of these products, like ethyl 3-indolyl-acetoacetate, can be hydrolyzed to β-(3-indole)-propionic acid.

We claim:
An ester having the formula

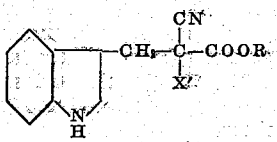

where X' is acylamino and R is lower alkyl.

NOEL F. ALBERTSON.
SYDNEY ARCHER.
CHESTER M. SUTER.

REFERENCES CITED

The following references are of record in the file of this patent:

Snyder, et al., J. Amer. Chem. Soc., vol. 66, pages 200–204, February 1944.

Adams et al., "Organic Reactions," vol. 1 (John Wiley & Sons, New York 1942), page 321.